United States Patent [19]

Barnes

[11] Patent Number: 4,748,530
[45] Date of Patent: May 31, 1988

[54] DISK COVER COLLAR

[75] Inventor: James L. Barnes, Elkhorn, Nebr.

[73] Assignee: Magnetic Peripherals, Inc., Minneapolis, Minn.

[21] Appl. No.: 851,590

[22] Filed: Apr. 14, 1986

Related U.S. Application Data

[63] Continuation-in-part of Ser. No. 460,671, Jan. 24, 1983, abandoned.

[51] Int. Cl.4 .............................................. G11B 23/03
[52] U.S. Cl. .................................................. 360/133
[58] Field of Search ........................... 360/133, 97–99; 206/444

[56] References Cited

U.S. PATENT DOCUMENTS

| | | |
|---|---|---|
| 3,465,875 | 9/1969 | McKelvey . |
| 3,526,884 | 9/1970 | Buslik et al. . |
| 3,543,921 | 12/1970 | Bradley . |
| 3,543,922 | 12/1970 | Charlton . |
| 3,570,661 | 3/1971 | Kersh . |
| 3,785,184 | 1/1974 | Wirth . |
| 3,882,701 | 5/1975 | Wirth . |
| 3,917,068 | 11/1975 | Cheney . |
| 4,013,169 | 3/1977 | Cheney . |
| 4,078,246 | 3/1978 | Berthoux et al. . |
| 4,089,414 | 3/1978 | Sandor . |
| 4,194,228 | 3/1980 | Duff . |
| 4,208,117 | 6/1980 | Harvey . |
| 4,222,487 | 9/1980 | Abel . |
| 4,320,425 | 3/1982 | Hall . |
| 4,445,155 | 4/1984 | Takahaski . |
| 4,490,764 | 12/1984 | Butz .................................. 360/133 |

Primary Examiner—A. J. Heinz
Attorney, Agent, or Firm—Bill D. McCarthy

[57] ABSTRACT

In a disk cartridge having a housing containing a rotatable data storage disk and hub assembly, the hub having a centered circular plate portion accessible through a housing aperture, a disk cover collar having a flexible removable bottom cover supported by the housing to cover the housing aperture and having an annular ring portion which provides a confinement ring for centering the hub and data storage disk as the disk cover collar flexes during normal handling of disk cartridge.

8 Claims, 1 Drawing Sheet

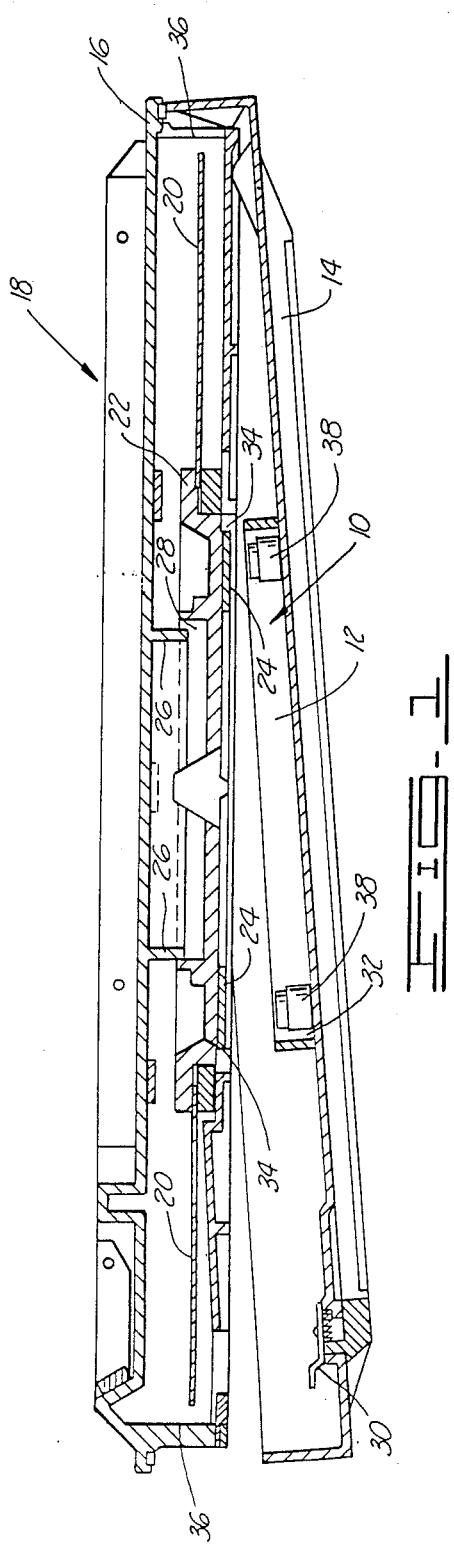
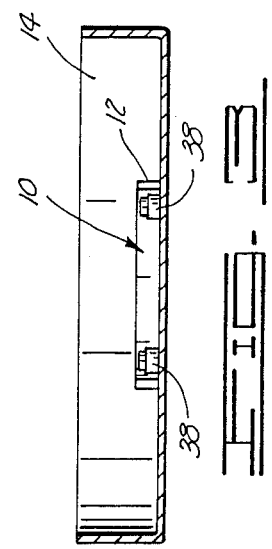
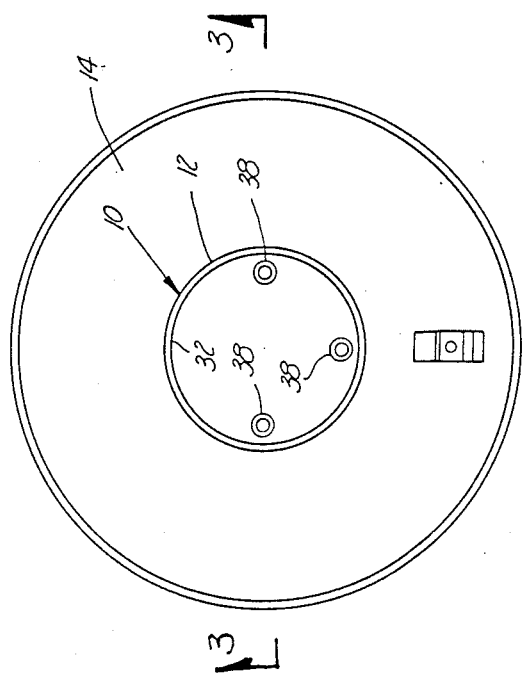

DISK COVER COLLAR

BACKGROUND OF THE INVENTION

This application is a continuation-in-part of my application having the same title and filed on Jan. 24, 1983 having Ser. No. 460,671, and now abandoned.

The invention relates to a disk cover collar for recording media and more particularly, but not by way of limitation, to a flexible disk cover collar used for engaging and holding a data storage disk immobile in a disk cartridge to prevent radial movement of the disk in the cartridge to prevent radial movement of the disk in the cartridge.

Heretofore, there have been various types of devices to prevent slippage of a data storage disk in a disk cartridge such as U.S. Pat. No. 4,194,228 to Duff and various types of dust covers and locking mechanisms as described in the following patents: U.S. Pat. Nos. 3,465,875 to McKelvey; 3,526,884 to Buslik et al; 3,543,921 to Bradley; 3,785,184 to Wirth; 3,882,701 to Wirth; 3,917,068 to Chency; 4,013,169 to Chency; 4,078,246 to Berthoux et al; 4,089,414 to Sandor; 4,208,117 to Harvey; 4,222,487 to Abel; 3,570,661 to Kersh; 3,543,922 to Charlton; 4,320,425 to Hall and 4,445,155 to Takahaski.

None of the above-mentioned patents specifically are the unique features and advantages of the subject disk cover collar as described herein.

SUMMARY OF THE INVENTION

The subject invention prevents radial movement of a data storage disk so the disk and data thereon are not damaged or destroyed which heretofore happened due to radial movement of the disk hitting the sides of the disk cartridge should the cartridge be dropped or hit a foreign object.

The present disk cartridge cover has a disk cover collar which is simple in design and is readily adaptable for mounting on various types of data storage disk cartridges.

The disk cover is flexible for effecting easy mating with a disk hub as opposed to a rigid disk cover that would be difficult to attach to the hub causing added risk of disk contamination and potential radial movement of the disk.

The disk cover collar for engaging a data storage disk and preventing radial movement of the disk includes an annular ring attached to a flexible removable bottom cover of the disk cartridge. The inner diameter of the annular ring engages an outer diameter of an armature plate which is part of a hub in the center of the storage disk. The inner diameter of the annular ring rests around the outer diameter of the armature plate in a close slip fit so that the storage disk is prevented from moving radially in the disk cartridge when the disk is not in use.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a side sectional view of a typical disk cartridge having a data storage disk mounted therein and having a removable bottom cover constructed in accordance with the present invention.

FIG. 2 is a top view of a removable bottom cover of the disk cartridge of FIG. 1 with the collar mounted thereon.

FIG. 3 is a side sectional view of the bottom cover taken along lines 3—3 shown in FIG. 2.

DETAILED DESCRIPTION OF THE DRAWINGS

In FIG. 1 the disk cover collar is designated by general reference numeral 10. The disk cover collar 10 includes an annular ring 12 mounted on and extending upwardly from a removable bottom cover 14 which is attached to a housing 16 of a disk cartridge designated by general reference numeral 18. The collar 10 is made of a flexible polycarbonate or similar plastic material.

Mounted inside the housing 16 of the cartridge 18 is a magnetic data storage disk 20. The disk 20 includes a hub 22 centered on the disk 20 and including a magnetic armature plate 24. The housing 16 further includes an upper centering ring 26 attached to the top of the housing 16. It can be seen in the drawings that the ring 26 is sufficiently small enough when received inside the hub 22 to provide a space 28 to allow the hub 22 to rotate within the housing 16 when the disk 20 is in use.

When the data storage disk 20 is to be used in a computer disk drive, the bottom cover 14 is released from the bottom of the housing 16 through the use of a latch 30 which disengages the bottom cover 14 from the housing 16. When the disk cartridge 18 is removed from the disk drive and the disk 20 is no longer in use, the removable bottom cover 14 is again attached to the bottom of the housing 16. When the bottom cover 14 engages the bottom of the housing 16, the annular ring 12 moves upwardly and an inner diameter 32 of the ring 12 is received around an outer diameter 34 of the armature plate 24. The ring 12 nests around the armature plate 24 in a close slip fit. The close slip press fit of the ring 12 around the armature plate 24 insures that the disk 20 cannot move radially inside the disk cartridge 18. The ring 12 typically has a 0.005 to 0.015 inch larger inside diameter than the maximum outside diameter of the armature plate 24. This provides a controlled slip fit.

Further, because the ring 12 and bottom cover 14 are made of a flexible material, close tolerances can be maintained to safely hold the disk 20 immobile yet the ring 12 can easily engage and self center the circular armature plate 24, when not properly centered, within the confinement of the ring 12. A rigid bottom cover with the same tolerances would be difficult to use since it would not follow a line of least resistance to automatically engage in a slip fit about the outer diameter of the plate 24. The ease in use of the flexible disk cover collar 10 insures that the cartridge is properly closed, the disk 20 is immobile to radial movement and the risk of contamination is greatly reduced. Should the ring 12 not be completely centered on the armature plate 24 when the removable bottom cover 14 is reattached to the cartridge 18, subsequent vibration during handling will cause the flexibility of the ring 12 and bottom cover 14 to permit the hub 22 to move into place, or self center, so that the armature plate 24 will be caused to be disposed within the confinement of the annular ring 12. That is, the annular ring 12 is intended to surround the circular armature plate upon attachment of the bottom cover 14 to the cartridge 18, but in the event that these components do not mate, that is, the hub 22 is not centered relative to the annular ring 12, radial movement of the hub 22 will be permitted by the flexibility of the ring 12 and bottom cover 14 until alignment of the hub 22 and the ring 12 occurs, whereupon the axial resiliency of the cover 14 causes mating thereof and restrains further radial movement of the hub 22 and storage disk 20.

It should be noted prior to the subject invention the disk 20 would have been subject to radial movement inside the housing 16, and should the disk 20 contact sides 36 of the housing 16, the disk 20 and data thereon could be damaged and destroyed.

In FIG. 2 a top view of the removable bottom cover 14 is shown. Centered on the cover 14 is the annular ring 12. Also shown in this view are the latch 30 and a plurality of posts 38 which are used to engage the bottom of the armature plate 24 to prevent movement in a vertical direction as described in U.S. Pat. No. 4,194,228 to Duff.

In FIG. 3 a sectional view of the removable cover 14 is shown taken along lines 3—3 in FIG. 2. In this view the ring 12 is shown extending upwardly from the bottom cover 14 and surrounding the posts 38. While the annular ring 12 of the disk cover collar 10 is shown for engaging the outer diameter of the armature plate 24, the ring 12 can work equally well in engaging a portion of the hub 22 or any other portion of the disk 20 to center the hub 22 until mating with the annular ring 12 and to thereafter prevent radial movement of the disk 20 in a standard disk cartridge.

Changes may be made in the construction and arrangement of the parts or elements of the embodiments as described herein without departing from the spirit or scope of the invention defined in the following claims.

What is claimed is:

1. In combination with a disk cartridge of the type having a housing containing a rotatable data storage disk and hub assembly, the hub assembly having a circular plate centered on the hub and accessible through an aperture in the housing, the disk cover collar comprising:

collar means attachable to the housing for protecting the data storage disk in a storage mode thereof, the cover means comprising:

a flexible cover member removably supportable by the housing so as to cover the accessing aperture;

an annular ring supported by the cover member, the annular ring having an internal diameter disposable about the circular plate on the hub so that the resiliency of the cover member urges the annular ring against the circular plate and hub to permit same to center within the confinement of the annular ring after which the annular ring restrains radial movement of the hub; and plural posts supported by the cover member within the annular ring and disposed to engage the bottom surface of the circular plate.

2. The disk cover collar of claim 1 further comprising:

latch means for selectively securing the cover member to the housing.

3. The disk cover collar of claim 1 wherein the annular ring is integrally formed as part of the cover member.

4. The disk cover collar of claim 3 wherein the cover member and annular ring are made of flexible plastic material.

5. In combination with a disk cartridge including a storage disk and hub assembly contained within a housing having a central aperture adjacent to the hub and permitting access thereto, and wherein the hub includes a circular portion centered on the hub and accessible through the aperture, a disk cover collar comprising:

an axially flexible cover attachable to the housing to enclose the aperture, the cover having an annular ring positioned adjacent the housing aperture when the cover is attached to the housing, the annular ring surrounding the circular portion to align the circular portion and the annular ring, the axial resiliency of the cover effecting mating of the circular portion and the annular ring and thereafter restraining further radial movement of the hub; and plural posts supported by the cover member within the annular ring and disposed to engage the bottom surface of the circular portion of the hub.

6. The disk cover collar of claim 5 further comprising:

latch means for selectively securing the cover to the housing.

7. The disk cover collar of claim 5 wherein the annular is integrally formed with the cover.

8. The disk cover collar of claim 7 wherein the cover and annular ring are made of flexible plastic material.

* * * * *

UNITED STATES PATENT AND TRADEMARK OFFICE
CERTIFICATE OF CORRECTION

PATENT NO. : 4,748,530
DATED : May 31, 1988
INVENTOR(S) : James L. Barnes

It is certified that error appears in the above-identified patent and that said Letters Patent is hereby corrected as shown below:

In column 1, lines 14 and 15, delete the second occurrence of the words "to prevent radial movement of the disk in the cartridge". In column 2, line 47, insert a comma "," after the word "immobile".

Signed and Sealed this

Third Day of January, 1989

Attest:

DONALD J. QUIGG

*Attesting Officer*   *Commissioner of Patents and Trademarks*